US012152616B2

(12) United States Patent
Johansson et al.

(10) Patent No.: US 12,152,616 B2
(45) Date of Patent: Nov. 26, 2024

(54) PNEUMATIC CYLINDER SYSTEM

(71) Applicant: STACCATO TECHNOLOGIES AB, Haninge (SE)

(72) Inventors: Per-Ove Johansson, Trångsund (SE); Twana Ibrahim, Stockholm (SE)

(73) Assignee: STACCATO TECHNOLOGIES AB, Haninge (SE)

( * ) Notice: Subject to any disclaimer, the term of this patent is extended or adjusted under 35 U.S.C. 154(b) by 0 days.

(21) Appl. No.: 18/264,989

(22) PCT Filed: Feb. 8, 2022

(86) PCT No.: PCT/SE2022/050133

§ 371 (c)(1),
(2) Date: Aug. 10, 2023

(87) PCT Pub. No.: WO2022/173350

PCT Pub. Date: Aug. 18, 2022

(65) Prior Publication Data

US 2024/0117821 A1 Apr. 11, 2024

(30) Foreign Application Priority Data

Feb. 11, 2021 (SE) .................................... 2150148-1

(51) Int. Cl.
*F15B 9/09* (2006.01)
*F15B 11/00* (2006.01)
*F15B 11/06* (2006.01)

(52) U.S. Cl.
CPC .............. *F15B 9/09* (2013.01); *F15B 11/006* (2013.01); *F15B 11/06* (2013.01);
(Continued)

(58) Field of Classification Search
CPC ............ F15B 9/09; F15B 11/006; F15B 11/06
See application file for complete search history.

(56) References Cited

U.S. PATENT DOCUMENTS 4,416,187 A 11/1983 Nystroem
4,481,768 A * 11/1984 Goshorn ................ G05B 19/44
60/407

(Continued)

FOREIGN PATENT DOCUMENTS

CN 103671952 A 3/2014
CN 111750160 A 10/2020

(Continued)

OTHER PUBLICATIONS

International Search Report for PCT/SE2022/050133 dated May 16, 2022, 4 pages.

(Continued)

*Primary Examiner* — Michael Leslie
(74) *Attorney, Agent, or Firm* — NIXON & VANDERHYE P.C.

(57) ABSTRACT

A cylinder positioning system (1) comprising a control unit for a pneumatically driven cylinder (14) in a cylinder chamber is provided. The control unit comprising a controller configured to control a set of drive units of the cylinder positioning system. Each drive unit emits a drive current to a respective electromagnetic direct acting valve (9,10, 11, 12) of the cylinder positioning system. Each respective electromagnetic direct acting valve has a closing/opening time of less than 2 ms. The control unit is configured to receive a set position for the cylinder and an actual position for the cylinder, to compare the set position of the cylinder with the actual position of the cylinder and to emit control signals to the drive units to move the cylinder from the actual position towards the set position. By providing a very short time for actuation of the valves, in combination with an actual position for the cylinder a closed loop control can be achieved to control the flow to the actuating cylinder to be proportional over essentially the entire dynamic range of the pneumatic position control system. This in turn can make (Continued)

the control more accurate and robust and with smaller latency.

10 Claims, 3 Drawing Sheets

(52) U.S. Cl.
CPC ............... *F15B 2211/30575* (2013.01); *F15B 2211/328* (2013.01); *F15B 2211/6336* (2013.01); *F15B 2211/6656* (2013.01); *F15B 2211/7053* (2013.01); *F15B 2211/7656* (2013.01); *F15B 2211/8855* (2013.01)

(56) References Cited

U.S. PATENT DOCUMENTS

| | | | | |
|---|---|---|---|---|
| 4,628,499 | A * | 12/1986 | Hammett | F15B 15/2861 700/282 |
| 7,021,191 | B2 * | 4/2006 | Moler | G05B 19/43 91/393 |
| 10,641,397 | B2 * | 5/2020 | Bjerrehorn | F16K 1/44 |
| 10,774,857 | B2 * | 9/2020 | Neumann | F15B 11/064 |
| 10,954,969 | B2 * | 3/2021 | Fallahi | F15B 13/0401 |
| 2004/0200349 | A1 | 10/2004 | Moler et al. | |
| 2019/0017520 | A1 | 1/2019 | Fallahi | |

FOREIGN PATENT DOCUMENTS

| | | | |
|---|---|---|---|
| DE | 3709211 | A1 | 10/1988 |
| DE | 102006058913 | A1 | 6/2008 |
| JP | H05321904 | A | 12/1993 |
| WO | 2007110488 | A1 | 10/2007 |

OTHER PUBLICATIONS

Written Opinion of the ISA for PCT/SE2022/050133 dated May 16, 2022, 12 pages.

* cited by examiner

PNEUMATIC CYLINDER SYSTEM

CROSS-REFERENCE TO RELATED APPLICATIONS

This application is the U.S. national phase of International Application No. PCT/SE2022/050133 filed Feb. 8, 2022 which designated the U.S. and claims priority to SE Patent Application No. 2150148-1 filed Feb. 11, 2021, the entire contents of each of which are hereby incorporated by reference.

TECHNICAL FIELD

The invention relates to a method and a controller for improving the positioning in a pneumatic actuator system. The invention also relates to a pneumatic positioning system, a control unit for such a system and a method for controlling the system.

BACKGROUND

Positioning is used extensively in industrial processes. In general, positioning is used to control and actuate functions in e.g., industry, heating and plumbing, automation and automotive applications. Example are functions as throttle control and linear or circular movement. Common positioning systems can employ pneumatically driven cylinders/cylinder combinations or electrical servo motors or actuators.

In many applications there are a need for:

High positioning accuracy
High load capacity
High positioning speed
Low system weight
High positioning performance in explosive environments
Low cost Improved pneumatic positioning performance as above is advantageous in e.g., pneumatic robotic gripper applications enabling a combination of low weight high force and gripper precision, important aspects related to robotic arm performance.

Electrical actuators may in many cases meet the needs. However, such actuators typically suffer from:

High system weight
High electrical energy vs load
Not preferred in explosive environments
High cost Pneumatic cylinder/valve systems may in many cases meet the needs, but existing pneumatic systems typically suffer from:

Low positioning accuracy
Low positioning speed

For example, US20040200349 describes a conventional pneumatic system.

In general, there is a constant need to improve positioning systems in respect of accuracy, speed, weight, load capacity and cost. Hence, there exists a need for an improved positioning system.

SUMMARY

It is an object of the present invention to provide an improved positioning system.

This object is obtained by a device and as set out in the appended claims.

As has been realized by the inventor, a pneumatic cylinder/valve system with improved actuating speed, position accuracy and position stability can be provided by a control system generating control signals for fast acting electromagnetic valves used to control the position of a pneumatically driven cylinder. Thus, an air supply system comprising fast acting electromagnetic valves feed air to the cylinder. The electromagnetic valves used in the positioning system controlling the cylinder preferably also can be designed to provide a high air flow. Hereby the performance at which the position of the cylinder can be controlled can be significantly increased.

In accordance with the invention, a cylinder positioning system comprising a control unit for a pneumatically driven cylinder in a cylinder chamber is provided. The control unit comprising a controller configured to control a set of drive units of the cylinder positioning system. Each drive unit emits a drive current to a respective electromagnetic direct acting valve of the cylinder positioning system. Each respective electromagnetic direct acting valve has a closing/opening time of less than 2 ms. The control unit is configured to receive a set position for the cylinder and an actual position for the cylinder, to compare the set position of the cylinder with the actual position of the cylinder and to emit control signals to the drive units to move the cylinder from the actual position towards the set position. By providing a very short time for actuation of the valves, in combination with an actual position for the cylinder a closed loop control can be achieved to control the flow to the actuating cylinder to be proportional over essentially the entire dynamic range of the pneumatic position control system. This in turn can make the control more accurate and robust and with smaller latency. Thus, the system will be very quick to react to unexpected variations in load and load demand from an actuator driven by the cylinder. Hence, the system enables the actuator to with high precision complete its task.

In accordance with some embodiments, the cylinder positioning system further comprises at least one pressure sensor measuring a pressure in the cylinder, and the control unit is further configured to receive at least one signal indicating the actual pressure in the cylinder chamber and controlling the position based on the actual pressure in the cylinder chamber. Hereby the control can be improved in that the control method can take into account e.g., fluctuations in the supply air pressure. Other parameters can be also be used. For example, the cylinder speed can be obtained and used in the control.

In accordance with some embodiments, the control unit is further configured to control the air flow by switching the electromagnetic direct acting valves with a switching cycle of at least 25 Hz. Hereby a very fast control can be achieved, which is particularly beneficial for smaller cylinders. The switching cycle is enabled due to the low latency in the closed loop used to control the cylinder. The control unit can advantageously be configured to control the air flow by switching the electromagnetic direct acting valves using Pulse Width Modulation, PWM.

The invention also extends to a pneumatic actuator system comprising a pneumatically driven actuator, i.e., the cylinder above, and the cylinder positioning system. The pneumatic actuator system can be sectioned into two parts, a first part where the control system is located and a second part where the actuator is located. Hereby the pneumatically driven actuator/cylinder can be placed in a hazardous/explosive environment but still be fast because of the electrically controlled valves that can be located outside hazardous/explosive environment.

BRIEF DESCRIPTION OF THE DRAWINGS

The invention will now be described in more detail, by way of example, and with reference to the accompanying drawings, in which.

DETAILED DESCRIPTION

The invention will now be described more fully hereinafter with reference to the accompanying drawing, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those skilled in the art. For example, like or similar components of different embodiments can be exchanged between different embodiments. Some components can be omitted from different embodiments. Like numbers refer to like elements throughout the description.

Figure 1:
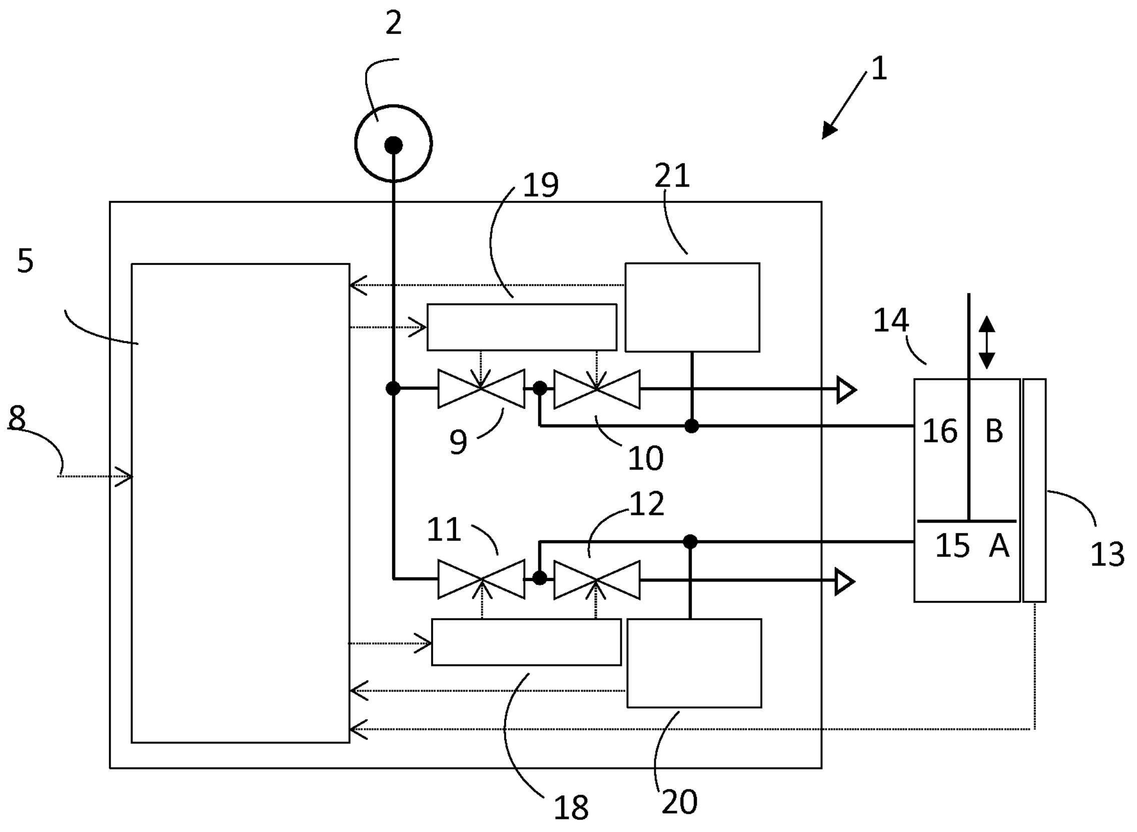
FIG. 1 illustrates a control system.

In FIG. 1, a pneumatically driven cylinder 14 is controlled by a positioning system 1 is illustrated. The pneumatic cylinder 14 can be configured to operate as an actuator to drive some element. The positioning system 1 is fed with air from an air-supply 2 and the cylinder 14 is positioned by the positioning system 1 as will now be described in conjunction with the exemplary positioning system 1 of FIG. 1.

The pneumatic cylinder 14 comprises a first chamber 15 with pressure A and a second chamber 16 with pressure B. The two chambers 15 and 16 are located on different sides of the cylinder 14 (typically on different sides of the cylinder head of the cylinder 14). The chambers 15 and 16 are pressurized and depressurized by an arrangement comprising four electromagnetic fast acting valves 9, 10 11 and 12. The valves can for example be valves similar to the valve described in U.S. Pat. No. 10,641,397 B2. In other embodiments the number of valves can be 2 to 8. The fast acting valves 9, 10 11 and 12 each have an opening/closing time of less than 2 ms.

In order to improve the cylinder actuating speed, position accuracy and position stability, the cylinder actuation velocity is controlled by proportionally pressurize and depressurize the cylinder chambers 15 and 16. In order to achieve a proportional pressurizing and depressurizing of chambers 15 and 16, the valves 9 to 12 are individually controlled in a way that fast acting, proportional flow, valve characteristics are achieved. This is obtained by designing the valves to have a very low opening/closing time of less than 2 ms. The fast action of the valves makes it possible to better control the air and thereby achieve a proportional control over (essentially) the entire control range. This being an unsolved problem with conventional solutions.

As has, surprisingly, been discovered, the properties of air in the control system become different when the opening/closing times become short enough. In such conditions the air properties become more similar to a liquid and the control become significantly better. Hereby, the control can become proportional over essentially the entire dynamic range whereby the control is significantly improved.

In the embodiment shown in FIG. 1, the valves 9 and 11 pressurize the chamber 15 and 16 respectively. The valves 10 and 12 depressurize chamber 15 and 16 respectively.

The actuator velocity control, i.e., the movement of the cylinder 14, is advantageously combined with a closed loop position feedback from an actual value position sensor 13 giving the position of the cylinder 14. The position sensor 13 can be located at the cylinder 14 or at some other location in the system where the position of the cylinder 14 can be determined directly or indirectly. A control unit 5 (typically implemented by some kind of controller such as a microprocessor) compare the actual position as given by position sensor 13 and a desired position signal 8 and combine actuator proportional velocity control in order to reach the desired (set) position as given by the signal 8.

In some embodiments the pressures A and B can be monitored by pressure sensors 20 and 21 in chambers 15 and 16, respectively. The pressure monitoring enables additional improvement of actuation performance e.g., for compensating pressure variations from air supply 2. Further, by knowing the pressures in the cylinder, the supplied pressure can be reduced to limit the power generated by the cylinder. This in turn will improve the control of the cylinder and the actuator that is driven by the cylinder.

As has been realized, in order to improve actuating speed, position accuracy and position stability in the pneumatic closed loop regulating system it is advantageous to reduce delays and achieve high pneumatic flow range.

The drive units 18 and 19 control the electromagnetic direct acting valves 9 to 12. In order to obtain a fast response time, the valves 9 to 12 are preferably controlled by the valve drivers 18 and 19 such that the coil excitation current and magnetization of the electromagnetic direct acting valves is fast. The response time of the direct acting electromagnetic is less than 2 ms. Hereby the switching can be made fast enough to achieve an improved proportional control over, essentially the entire dynamic range of the control system as will be described in more detail below.

The electromagnetic direct acting valves preferably also have a high dynamic flow range in order to achieve fast pressure control of the chambers 15 and 16. This is particularly beneficial when switching cycles (i.e., the cycle from one opening of the valve to the next opening of the valve) of the control position control system is short such as corresponding to at least 25 or 50 Hz or at least 100 Hz.

Further, the maximum flow of each electromagnetic direct acting valve is preferably made high. For example, the flow of each fully open electromagnetic direct acting valve is preferably dimensioned such that the pressure increase in the cylinder 14 is at least 2% or at least 5% or in some cases even at least 10% during a full open switching cycle of the position control system when the position control system operates in a range where the control is proportional as will be explained below.

Thus, the valves 9 to 12 fast response times on the electromagnetic direct acting valves enables a high pneumatic flow in the control system whereby the pressurizing and depressurizing time for the cylinder chambers 15 and 16 can be significantly reduced.

As set out above it is possible to in accordance with some embodiments have a switched current supplied to the electromagnetic direct acting valves 9 to 12 using e.g., Pulse Width Modulation (PWM) switching. By switching the valves using PWM modulation, proportional flow characteristics can be achieved. For example, a 50% duty cycle gives in average 50% flow. Hereby proportional flow characteristics can be given in the air supply 2 to the cylinder chambers 15 and 16. A wide proportional flow range in combination with high flow and fast switching valves 9 to 12, minimize the closed loop system delay and significantly improve the positioning performance.

Figure 3:
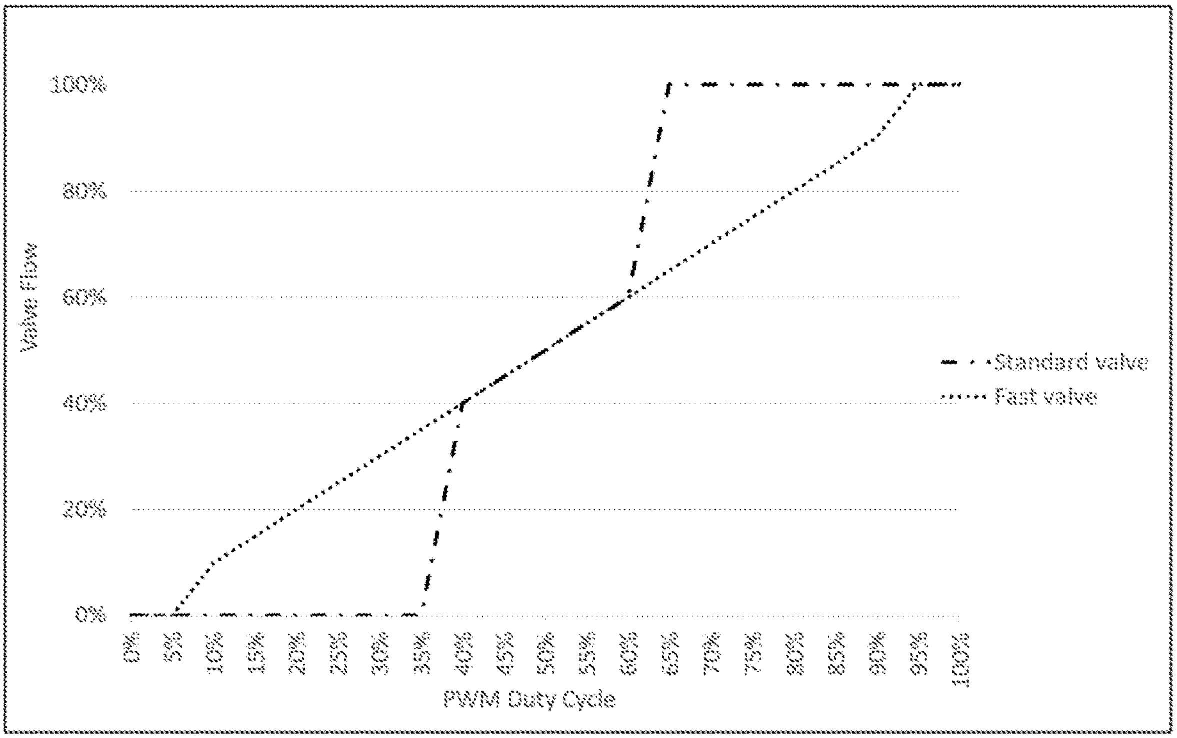
FIG. 3 is a graph that illustrates the proportional flow.

The graph in FIG. 3 illustrates the improved proportional flow dynamic range for the positioning system 1 in accordance with the teachings herein, compared with the flow dynamic range of a system using conventional positioning system. In the exemplary set-up used to create the graph below the electromagnetic direct acting valves are controlled by a 100 Hz on/off cycle frequency.

As can be seen, the dynamic range where the flow control is proportional can be increased by using valves have a very short opening/closing time. Typically, under 2 ms in opening/closing time is required to achieve the desired characteristic where the flow control is proportional over essentially the entire control range. The control achieved, can as mentioned, be even further enhanced by dimensioning the valves to provide a high enough air flow during a duty cycle of a switched control system. Hereby one duty cycle can change the pressure in a cylinder chamber during one single cycle to a degree that matches the desired proportional control even when the system operates at a high or low duty cycle, i.e., far out in the end regions of the duty cycle as illustrated above.

Using the valve and the air supply arrangement as set out herein can significantly improve positioning accuracy, speed and stability of a pneumatic cylinder/actuator.

Example of achieved positioning performance are:

Positioning accuracy down to ±0.02 mm

Positioning speed up to 8 m/s

Since the response time is fast the valve can be opened and closed with improved timing speed and precision compared to existing air supply valve systems. As a result, the pressurizing and depressurizing of the cylinder chambers can be fast and accurate. By improving pressure control of the cylinder, high positioning stability, speed and accuracy is achieved.

In the exemplary system described herein 4 electromagnetic direct acting valves are used. However, it is also possible to design a control system with fewer or more electromagnetic direct acting valves. For example, if replacing the double acting pneumatic cylinder 14 with a single acting spring return pneumatic cylinder. Only chamber 15 needs to be pressurized and depressurized in order to maneuver the cylinder. In the example only two valves 11 and 12 are needed.

Figure 2:
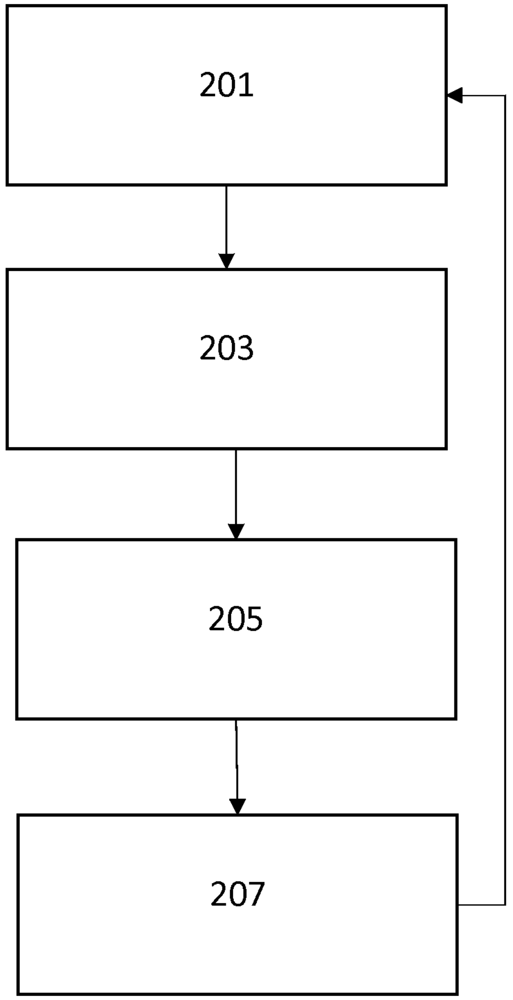
FIG. 2 is a flow chart illustrating steps performed when controlling the position of a pneumatically driven cylinder.

In FIG. 2, a flow chart illustrating some control steps performed when controlling a positioning system 1 in accordance with the above. First, in a step 201 a set position is received corresponding to the desired position of the valve 14. Next, in a step 203, the system obtains the actual position of the cylinder. The position can for example be obtained by a position sensor arranged at the cylinder. In accordance with some embodiments, the system further obtains additional input signals in a step 205. The additional input signals can for example be pressure signals from the cylinder chamber. In particular the pressures from both sides of the cylinder can be obtained. Also, the supply air pressure can be obtained. Based on the set position of the cylinder and the obtained actual position of the cylinder and potentially some additional input signals, the system controls the position of the cylinder in a step 207. The control is performed by emitting control signals from a controller to drive units. The drive units in turn emits drive currents to electromagnetic direct acting valves used to control the pressure at each side of the cylinder by increasing or decreasing the pressure in a chamber at one or both sides of the cylinder.

The control is performed by continuously giving a set position for the cylinder (or the actuator driven by the cylinder). The set position is compared with the actual position. When there is a difference the pressures in the cylinder needs to be adjusted to reach the set position of the cylinder. A problem in such a control is that the pressure adjustment required can vary for identical differences between set position and actual position. Such variations can be caused by random forces or hinders in the system. The combination of closed loop system for position control together with fast valves enables the system to handle such varying pressure requirements. The pressure sensor signals can also be used as additional information to get early information about changing conditions in the cylinder that can be caused by such random forces/hinders.

Further, the known position at previously recorded positions can be used in the control. For example, by deriving the position change speed, a more refined control can be achieved. In such a control, system the controller can be configured to use not only the set position and the actual position, but also the speed of the cylinder in when controlling the pressure in the cylinder. In addition, actual pressure in the cylinder can also be used.

The positioning control system as described herein is fast, robust and the control can be made proportional over a large range. The system relies on a pneumatically driven actuator. Because the actuator is pneumatically driven it can be located in a hazardous environment such an environment with risk for explosion. The positioning control system can then be located outside the hazardous environment. Thus, the overall system can be sectioned into a control part that uses an electrically actuated valve an actuator part that only uses pneumatic drive and which therefore can be placed in a hazardous/explosive environment.

The invention claimed is:

1. A cylinder positioning system comprising:

a set of drive units, a controller including processing circuitry configured to control a pneumatically driven cylinder in a cylinder chamber, the controller being configured to control the set of drive units, each drive unit configured to emit a drive current to a respective electromagnetic direct acting valve, and wherein each respective electromagnetic direct acting valve has a closing/opening time of less than 2 ms, wherein the controller is further configured to:

receive a set position for the cylinder and an actual position for the cylinder, compare the set position of the cylinder with the actual position of the cylinder, and generate a respective control signals to each of the drive units to move the cylinder from the actual position towards the set position, wherein a control range in which the cylinder positioning system can be controlled proportionally is increased because the closing/opening time for each respective electromagnetic direct acting valve is less than 2 ms.

2. The cylinder positioning system according to claim 1, further comprising at least one pressure sensor measuring a pressure(s) in a chamber of the cylinder, wherein the controller is further configured to receive at least one signal indicating the actual pressure in the cylinder chamber and controlling the position based on an actual pressure in the cylinder chamber.

3. The cylinder positioning system according to claim 1, wherein the controller is further configured to control the air flow by switching the electromagnetic direct acting valves with switch cycles of at least 25 Hz.

4. The cylinder positioning system according to claim 3, wherein the controller configured to control the air flow by switching the electromagnetic direct acting valves using PWM.

5. The cylinder positioning system according to claim 1, wherein four electromagnetic direct acting valves are provided, and wherein a first electromagnetic direct acting valve is configured to control pressurizing of a first chamber of the cylinder, a second electromagnetic direct acting valve is configured to control de-pressurizing of the first chamber of the cylinder, a third electromagnetic direct acting valve is configured to control pressurizing of a second chamber of the cylinder, and a fourth electromagnetic direct acting valve is configured to control de pressurizing of the second chamber of the cylinder.

6. The cylinder positioning system according to claim 1, wherein the flow of each fully open electromagnetic direct acting valve is such that the pressure increase in the cylinder is at least 2% during a full switch cycle.

7. The cylinder positioning system according to claim 1, wherein the controller is further configured to obtain a cylinder speed and to use the cylinder speed when controlling the position of the cylinder.

8. A pneumatic actuator system comprising a pneumatically driven actuator and the cylinder positioning system according to claim 1.

9. The pneumatic actuator system according to claim 8, wherein the pneumatic actuator system is sectioned into two parts, a first part where the control system is located and a second part where the actuator is located.

10. A method in a cylinder positioning system comprising a controller that controls a pneumatically driven cylinder in a cylinder chamber and a set of drive units of the cylinder positioning system, each drive unit emitting a drive current to a respective electromagnetic direct acting valve of the cylinder positioning system, and wherein each respective electromagnetic direct acting valve has a closing/opening time of less than 2 ms, the method comprising the steps of:

receiving a set position for the cylinder and an actual position for the cylinder, comparing the set position of the cylinder with the actual position of the cylinder and generating a respective control signals to each of the drive units to move the cylinder from the actual position towards the set position, wherein a control range in which the cylinder positioning system can be controlled proportionally is increased because the closing/opening time for each respective electromagnetic direct acting valve is less than 2 ms.

* * * * *